(12) United States Patent
Huynh

(10) Patent No.: US 10,893,728 B2
(45) Date of Patent: Jan. 19, 2021

(54) JEWELRY HAVING DRUZY OR GEODE EFFECT AND METHODS OF MANUFACTURE

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 329 days.

(21) Appl. No.: 15/884,025

(22) Filed: Jan. 30, 2018

(65) Prior Publication Data

US 2018/0213898 A1 Aug. 2, 2018

Related U.S. Application Data

(60) Provisional application No. 62/452,255, filed on Jan. 30, 2017.

(51) Int. Cl.
| | |
|---|---|
| *A44C 27/00* | (2006.01) |
| *A44C 17/00* | (2006.01) |
| *C09J 1/00* | (2006.01) |
| *A44C 17/02* | (2006.01) |
| *C09J 5/06* | (2006.01) |
| *A44C 17/04* | (2006.01) |

(52) U.S. Cl.
CPC ............ *A44C 17/02* (2013.01); *A44C 17/007* (2013.01); *A44C 17/04* (2013.01); *C09J 1/00* (2013.01); *C09J 5/06* (2013.01); *A44C 27/002* (2013.01); *C09J 2400/14* (2013.01); *C09J 2400/16* (2013.01)

(58) Field of Classification Search
CPC ........ A44C 17/04; A44C 27/002; A44C 17/00
See application file for complete search history.

(56) References Cited

U.S. PATENT DOCUMENTS

| | | | | | |
|---|---|---|---|---|---|
| 6,884,833 | B2* | 4/2005 | Chheang | ................ | C08K 3/346 524/445 |
| 7,412,848 | B2* | 8/2008 | Johnson | ................. | B22D 19/00 63/23 |
| 7,526,928 | B1* | 5/2009 | Kearnes | ................. | A44C 17/00 63/32 |
| 2006/0037361 | A1* | 2/2006 | Johnson | ................. | G04B 37/22 63/37 |
| 2006/0231171 | A1* | 10/2006 | Davis | ...................... | C22B 9/103 148/538 |
| 2009/0068238 | A1* | 3/2009 | Themens | ............... | A61K 8/891 424/401 |
| 2014/0007514 | A1* | 1/2014 | Rice | ........................ | B24D 11/00 51/298 |
| 2014/0170395 | A1* | 6/2014 | Kasperchik | .......... | C09D 11/106 428/204 |

* cited by examiner

*Primary Examiner* — Dana Ross
*Assistant Examiner* — Lawrence H Samuels
(74) *Attorney, Agent, or Firm* — Wagenknecht IP Law Group, PC

(57) ABSTRACT

A method of manufacturing an article of jewelry with a druzy or geode effect, the method including: forming an adhesion mixture by mixing metal particles with a silica, shell, and/or clay with polymer, optionally in a liquid to form an adhesion paste; applying the adhesion mixture to an article of jewelry; applying a plurality of gemstones to the applied adhesion mixture to form a gemstone layer; melting the adhesion mixture without significantly melting the article of jewelry; and cooling the adhesion mixture to bond the gemstone layer to the article of jewelry.

19 Claims, 5 Drawing Sheets

JEWELRY HAVING DRUZY OR GEODE EFFECT AND METHODS OF MANUFACTURE

CROSS REFERENCE TO RELATED APPLICATIONS

This application claims benefit of priority to U.S. provisional patent application no. 62/452,255, filed Jan. 30, 2017; the entire content of which is herein incorporated by reference in its entirety.

TECHNICAL FIELD

The invention relates generally to the field of jewelry and more specifically to methods of manufacturing druzy or geode effects on articles of jewelry, jewelry having a gemstone layer providing a druzy or geode effect, and methods of bonding gemstones to substrates to form a gemstone layer with a druzy or geode effect.

BACKGROUND OF THE INVENTION

Druzy is a term used in the jewelry industry to refer to a glittering effect of tiny crystals. The druzy effect is similar to that of a geode, which is a hollow mass of mineral found in certain sedimentary and volcanic rocks. One of the benefits of the druzy effect is that it does not require the extensive faceting found in more expensive gemstones. Rather, the tiny crystals of irregular shape, when grouped together diffract light in different directions, thereby forming the glittering effect. Therefore, the druzy or geode effect offers a striking appearance without the significant cost associated with faceting gemstones.

Gemstones are conventionally bonded to articles of jewelry through the use of prongs and/or jeweler's adhesive. However, prongs tend to isolate one gem from another, which results in spacing. This spacing deviates from a quality druzy or geode effect. Jeweler's adhesive and other glues can be used to adhere gemstones but glues can be challenging to work with when applying tiny gems. Therefore there is a need to develop improved methods to form a druzy or geode effect on jewelry.

SUMMARY OF THE INVENTION

The invention addresses the above deficiencies and provides related benefits. In one aspect of the invention a method of manufacturing an article of jewelry with a druzy or geode effect is provided, the method including: forming an adhesion mixture by mixing metal particles with a silica, optionally in a liquid to form an adhesion paste; applying the adhesion mixture to an article of jewelry; applying a plurality of gemstones to the applied adhesion mixture to form a gemstone layer; melting the metal particles and silica without significantly melting the article of jewelry; and cooling the melted particles and silica to bond the gemstone layer to the article of jewelry.

The ratio of metal particles to silica can vary. Preferably the weight percentage of metal particles is higher than the weight percentage of silica. In some embodiments the adhesion mixture has a ratio of about 75 wt % metal particles to about 25 wt % silica. Such an embodiment is especially preferred when the step of melting the metal particles and silica includes direct heating of the article of jewelry with applied gemstones, such as in a kiln.

In another embodiment, the adhesion mixture has a ratio of about 50 wt % non-ferromagnetic metal particles to about 25 wt % ferromagnetic metal particles to about 25 wt % silica. In such an embodiment, the step of melting the metal particles and silica may include direct heating or heating the ferromagnetic particles by electromagnetic induction to induce melting of the adhesion layer.

The metal particles may be pure metal element or may form part of a metal alloy with or without impurities. In some embodiments the metal particles include a metal or metal alloy selected from one or more of the group consisting of silver, gold, titanium, platinum, iron, and stainless steel.

The silica is preferably silicon dioxide. The silica may be obtained from crushed quartz, may be silica gel granules, or may include silica powder.

When using a liquid to form an adhesion paste, the liquid can vary but preferably includes an alcohol or an acetone. When the liquid is the alcohol, preferably the alcohol has fewer than 6 carbons. Non-limiting examples of suitable alcohols include those selected from the group consisting of methanol, ethanol, propanol, isopropanol, butanol, and tert-butanol.

In some embodiments, the article of jewelry is a pearl. In other embodiments, the article of jewelry is formed of a metal or metal alloy. In still further embodiments the article of jewelry is formed of a metal or metal alloy having at least one member selected from the group consisting of silver, gold, titanium, platinum, and stainless steel. In still further embodiments, the article of jewelry is formed of a same metal as the metal particles, more preferably non-ferromagnetic particles.

The gemstones applied to the adhesion mixture to form the druzy or geode effect can include one or more gems independently selected from the group consisting of an agate, an alexandrite, an amber, an arnetrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon. In preferred embodiments the step of applying gemstones includes applying larger gems prior to smaller gems, which forms a more complete gemstone layer.

In a related aspect, the invention also includes a method of manufacturing an article of jewelry with a druzy or geode effect, the method including: forming an adhesion mixture by mixing ferromagnetic metal particles, crushed shell, clay with polymer plastic, and optionally acetone to form adhesion paste; applying the adhesion mixture to an article of jewelry; applying a plurality of gemstones to the applied adhesion mixture to form a gemstone layer; heating the ferromagnetic metal particles by way of electromagnetic induction to cause the crushed shell, and clay with polymer plastic to melt without significantly melting the article of jewelry; and cooling the melted particles, crushed shell, and clay with polymer plastic to bond the gemstone layer to the article of jewelry.

The ratio of ferromagnetic metal particles within the adhesion mixture can vary. In some embodiments, the adhesion mixture has a ratio of about 25 wt % ferromagnetic metal particles to about 25 wt % crushed shell to about 50 wt % clay with polymer plastic.

In still another related aspect, an article of jewelry with a plurality of adhered gemstones forming a gemstone layer is provided, where the gemstone layer is adhered by way of a mixed layer of metal and silica. Preferably, the gemstone layer is achieved by applying different sized gemstones in series, the small gemstones applied to crevices formed between adjacent larger gemstones.

In still another related aspect, an article of jewelry with an applied adhesion mixture is provided, the adhesion mixture having metal particles mixed with a silica in a liquid and having a consistency of a paste.

In such embodiments the ratio of metal particles to silica can vary. In some embodiments, the adhesion mixture has a ratio of about 75 wt % metal particles to about 25 wt % silica. In other embodiments, the adhesion mixture has a ratio of about 50 wt % non-ferromagnetic metal particles to about 25 wt % ferromagnetic metal particles to about 25 wt % silica. In further embodiments, the metal particles include a metal alloy. As a non-limiting example, the metal particles can include a metal or metal alloy selected from one or more of the group consisting of silver, gold, titanium, platinum, and stainless steel.

The silica is preferably silicon dioxide. The silica may be obtained from crushed quartz, may be silica gel granules, or may include silica powder.

When using a liquid to form an adhesion paste, the liquid can vary but preferably includes an alcohol or an acetone. When the liquid is the alcohol and preferably the alcohol has fewer than 6 carbons. Non-limiting examples of suitable alcohols include those selected from the group consisting of methanol, ethanol, propanol, isopropanol, butanol, and tert-butanol.

In still another related aspect, a method of joining a non-ferromagnetic substrates is provided, the method including: forming an adhesion mixture by mixing about 60-75 wt % non-ferromagnetic metal particles with about 25-40 wt % ferromagnetic metal particles to a total of up to 100 wt %, with or without impurities, and optionally adding a liquid while mixing until reaching a consistency of a paste; positioning the adhesion mixture between two substrates thereby joining the two substrates; heating the mixture by electromagnetic induction to induce melting of the ferromagnetic metal particles for a time sufficient to melt the non-ferromagnetic particles at least partially by way of heat transfer; and cooling the ferromagnetic and non-ferromagnetic particles to bond the two substrates.

In some embodiments the substrates are metal rods or pipes. In some embodiments, the substrates are metals or metal alloys. In some embodiments the mixture is about 75 wt % non-ferromagnetic metal particles and about 25 wt % ferromagnetic metal particles.

In yet another related aspect, a method of joining non-ferromagnetic substrates is provided, the method including: forming an adhesion mixture by mixing about 25 wt % ferromagnetic metal particles with about 75% clay with polymer plastic, and optionally adding acetone while mixing until reaching a consistency of a paste; positioning the adhesion mixture between two non-ferromagnetic substrates thereby joining the two substrates; heating the mixture by electromagnetic induction to induce melting of the clay with polymer plastic; and cooling the adhesion mixture to bond the two substrates.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

For clarity of disclosure, and not by way of limitation, the invention is discussed according to different detailed embodiments; however, the skilled artisan would recognize that features of one embodiment can be combined with other embodiments and is therefore within the intended scope of the invention. Unless defined otherwise, all technical and scientific terms used herein have the same meaning as is commonly understood by one of ordinary skill in the art to which this invention belongs. If a definition set forth in this document is contrary to or otherwise inconsistent with a well-accepted definition set forth in the art, the definition set forth in this document prevails over a contradictory definition.

The invention provides methods of manufacturing an article of jewelry with a druzy or geode effect. In particular, the methods provide an improved approach to adhere a gemstone layer formed from a plurality off different sized gemstones to an article of jewelry compared to conventional techniques using commercial, prongs, jeweler's adhesive, and other glues.

When seeking a new approach to form a gemstone layer characterized as having a plurality of different sized gemstones on an article of jewelry, it was initially hypothesized that using a metal melt as an adhesive could be an effective alternative to conventional jeweler's adhesive. To this end, various metal melts were combined with gemstones for testing on jewelry substrates. Broadly, the metals were combined with gemstones, the metals melted, then cooled. Afterwards, they were tested for their ability to maintain the gemstone layer to the substrate surface by physical rubbing. Gemstones regularly fell from the mount. 10× microscopy also revealed spacing between the metal-gemstone interface and some but not extensive oxidation. An exemplary study is provided in Example 1. Thus, the molten-metal approach was considered insufficiently reliable for adhering gemstones to a metal substrate for jewelry.

Figure 1:
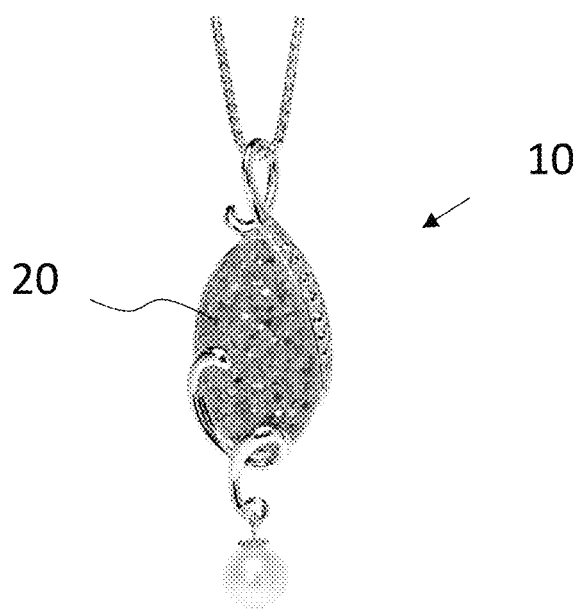
FIG. 1 is a photograph depicting an article of jewelry 10 in the form of a sliver pendent with a druzy or geode effect by an adhered gemstone layer 20 formed of crushed diamond.
Figure 2:
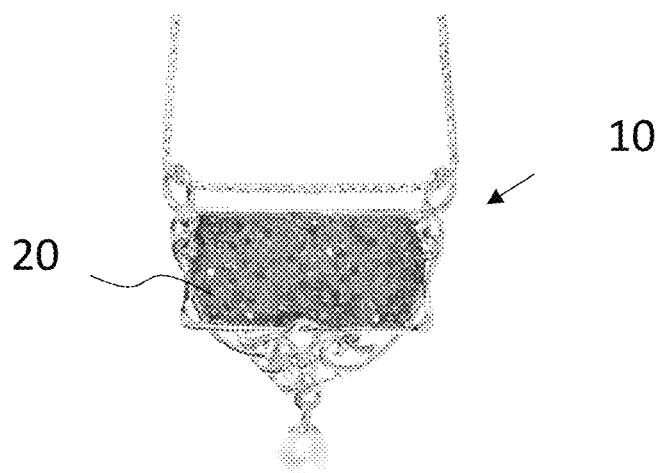
FIG. 2 is a photograph depicting an article of jewelry 10 in the form of a sliver pendent with a druzy or geode effect by an adhered gemstone layer 20 formed of crushed diamond.
Figure 3:
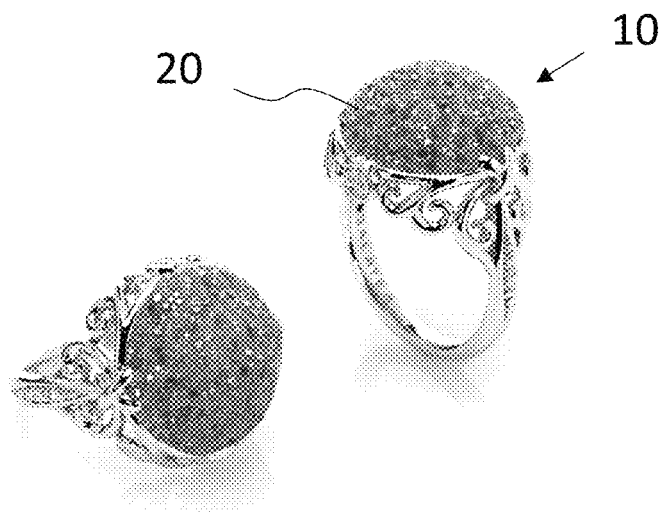
FIG. 3 is a photograph depicting an article of jewelry 10 in the form of a sliver ring with a druzy or geode effect by an adhered gemstone layer 20 formed of crushed diamond.
Figure 4:
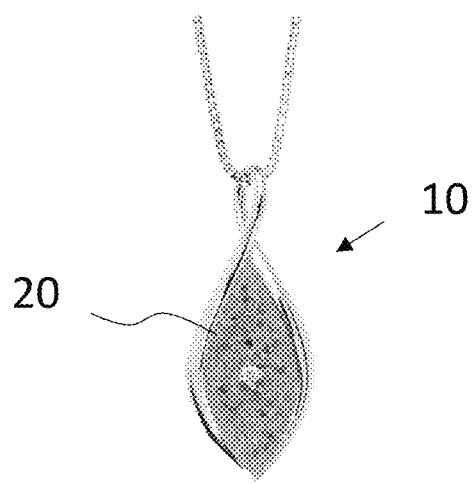
FIG. 4 is a photograph depicting an article of jewelry 10 in the form of a sliver pendent with a druzy or geode effect by an adhered gemstone layer 20 formed of crushed diamond together with a larger carat diamond.
Figure 5:
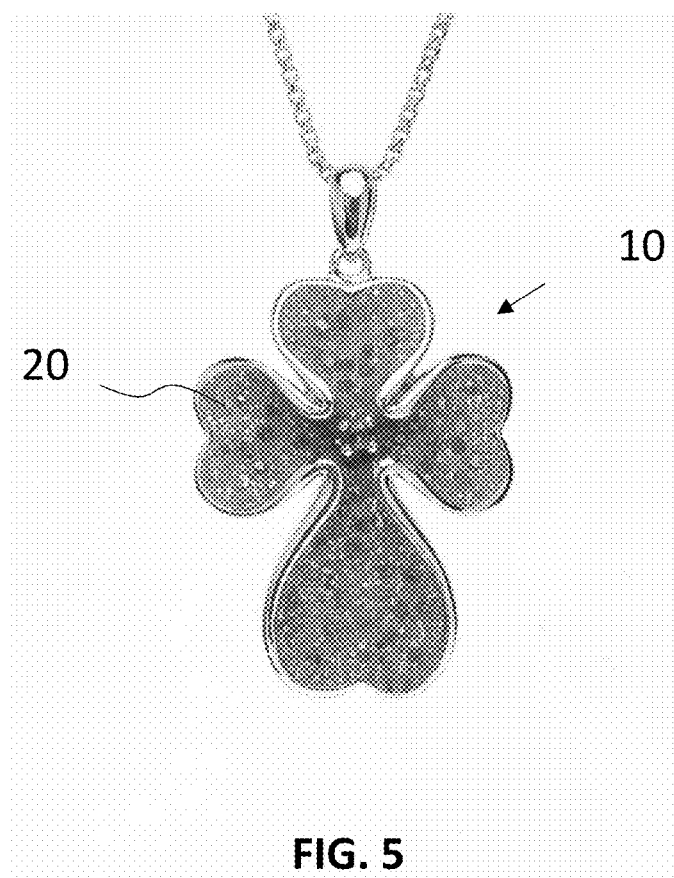
FIG. 5 is a photograph depicting an article of jewelry 10 in the form of a sliver pendent with a druzy or geode effect by an adhered gemstone layer 20 formed of crushed diamond together with a ruby
Figure 6:
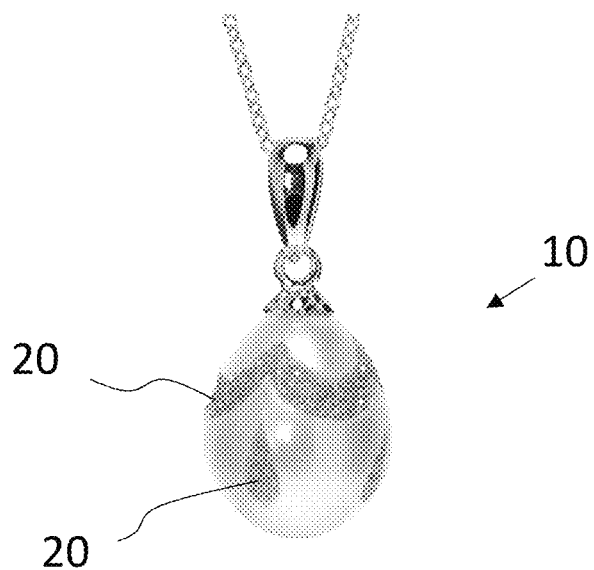
FIG. 6 is a photograph depicting an article of jewelry 10 in the form of a pearl pendent with a druzy or geode effect by an adhered gemstone layer 20 formed of crushed diamond within regions carved from the pearl.
Figure 7:
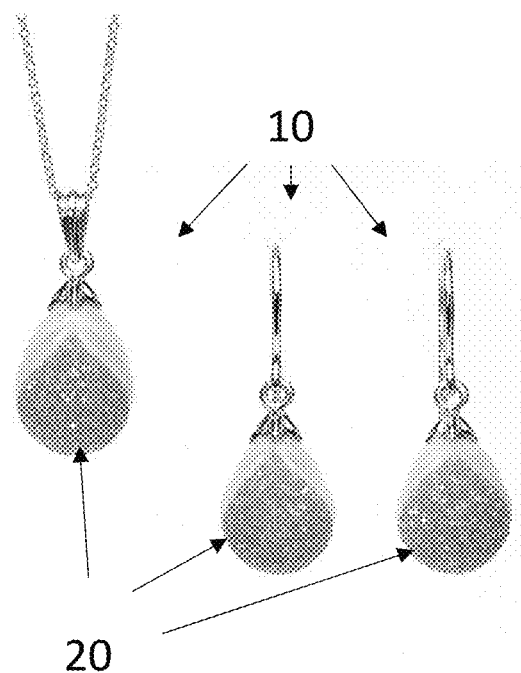
FIG. 7 is a photograph depicting an article of jewelry 10 in the form of a set of pearl earrings with necklace, each having a druzy or geode effect by an adhered gemstone layer 20 formed of crushed diamond within regions carved from the pearls.
Figure 8A:
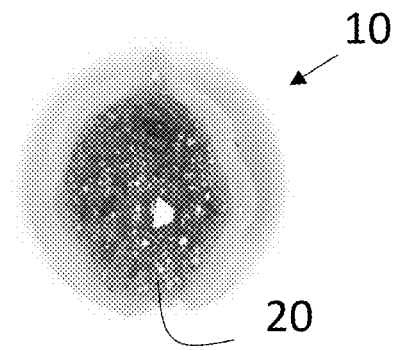
FIG. 8A is a photograph depicting an article of jewelry 10 in the form of a pearl with a druzy or geode effect by an adhered gemstone layer 20 formed of crushed diamond together with a larger carat diamond within a region carved from a pearl.
Figure 8B:
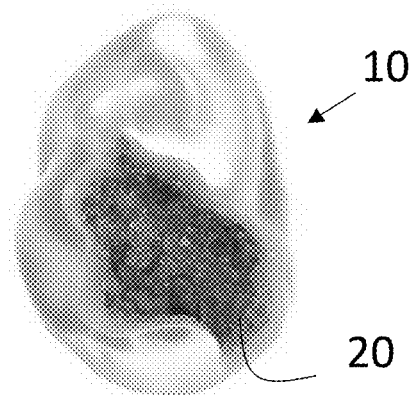
FIG. 8B is a photograph depicting an article of jewelry 10 in the form of a pearl with a druzy or geode effect by an adhered gemstone layer 20 formed of crushed diamond and ruby within a region carved from a pearl.
Figure 8C:
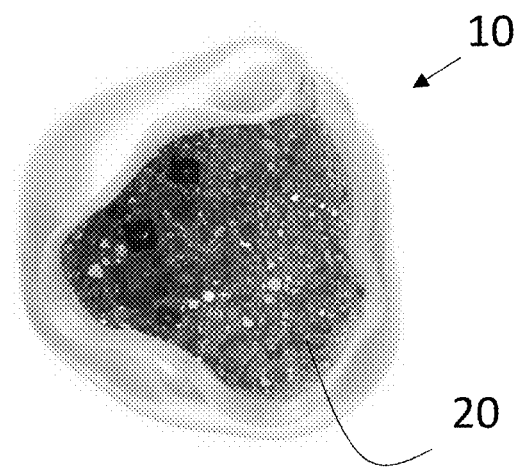
FIG. 8C is a photograph depicting an article of jewelry 10 in the form of a pearl with a druzy or geode effect by an adhered gemstone layer 20 formed of crushed diamond and pink tourmaline in a carved region of a pearl.

Turning now to FIGS. 1-8C, successful adhesion of a plurality of different sized gemstones to form a gemstone layer 20, thereby creating a druzy or geode effect to both a metal substrate (e.g. silver, gold, platinum, titanium) and to a pearl substrate for use as jewelry 10 has now been achieved. The approaches herein have been tested by physical rubbing to confirm the gemstones remain substantially adhered to the article of jewelry 10 and visual inspection under 10× microscopy notes the lack of gaps found when using the approach of Example 1. Still further testing over time has confirmed quality adhesion of gemstones to both metallic and pearl substrates remains.

As an introduction to the methods disclosed herein, in one embodiment a method of manufacturing an article of jewelry 10 with a druzy or geode effect is provided, which includes forming an adhesion mixture by mixing metal particles with a silica, optionally in a liquid until reaching a consistency of a paste; applying the adhesion mixture to an article of jewelry 10; applying a plurality of gemstones to the applied adhesion mixture to form a gemstone layer 20; melting the metal particles and silica without significantly melting or deforming the article of jewelry 10; and cooling the melted particles and silica to bond the gemstone layer 20 to the article of jewelry 10. When using jewelry 10 formed from metal or metal alloy, the melting of the adhesion mixture and bonding of the gemstone layer 20 was effective using a conventional kiln. However, by providing both ferromagnetic and non-ferromagnetic particles in the adhesion mixture, melting time was reduced and targeted melting was improved by way of electromagnetic induction. Electromagnetic induction with ferromagnetic particles surprisingly provided successful bonding of the gemstone layer 20 to both a metallic substrate and a pearl substrate.

In variant of the above, a method of method of manufacturing an article of jewelry 10 with a druzy or geode effect is provided, which includes: forming an adhesion mixture by mixing ferromagnetic metal particles, crushed shell, and clay with polymer plastic, and optionally a liquid, such as acetone, to form adhesion paste; applying the adhesion mixture to an article of jewelry 10; applying a plurality of gemstones to the applied adhesion mixture to form a gemstone layer 20; heating the ferromagnetic metal particles by way of electromagnetic induction to cause the crushed shell, and clay with polymer plastic to melt without significantly melting or deforming the article of jewelry 10; and cooling the melted particles, crushed shell, and clay with polymer plastic to bond the gemstone layer 20 to the article of jewelry 10.

In furtherance of the above, an article of jewelry 10 is provided with an applied adhesion mixture, the adhesion mixture having metal particles mixed with silica in a liquid and with a consistency of a paste. In some embodiments the metal particles include a mixture of ferromagnetic particles and non-ferromagnetic particles. Relatedly, an adhesion mixture is also provided, which includes nano-sized ferromagnetic particles mixed with silica or a combination of shell powder and clay with polymer plastic; and a liquid, where the mixture has a consistency of a paste and optionally includes non-ferromagnetic nano-sized particles.

The methods herein have been tested across multiple articles of jewelry 10 with surprisingly beneficial results. The term "article of jewelry" as used herein refers to any decorative items worn or associated with an individual for personal adornment, such as, but not limited to broches, rings, necklaces, earrings, pendants, bracelets, cuff links, tie tacks, glasses, sunglasses, and others. In some instances the article of jewelry 10 is worn by the individual, as in a necklace. In other instances, the article of jewelry 10 is affixed to clothing, such as a hat or jacket. In still other instances, the article of jewelry 10 is itself is associated with an accessory, such as an ornamental setting on a purse. To this end, the term "article of jewelry" is meant in a broad sense. The disclosure also uses the term "substrate" when referring the portion of the article of jewelry 10 that is to receive the adhesion mixture and gemstones to form the druzy or geode effect.

In some embodiments, the adhesion mixtures for adhering gemstones to articles of jewelry 10 include a mixture of a metal particles and silica. Preferably both the metal particles and silica are provided as nano-sized particles generally in powdered form. In such mixtures, the metal particles are typically provided in more abundance (in weight percentage) than the silica.

In some embodiments the adhesion mixture has a ratio of about 75 wt % metal particles to about 25 wt % silica. Such metal particles include but are not limited to silver, gold, titanium, platinum, iron, and stainless steel. This ratio was found particularly useful when heating the adhesion mixture in a kiln. However, other ratios would also be operable. For instance, metal particles greater than 50 wt % and silica particles less than 50 wt % would also be acceptable and are therefore also included within the scope of the invention. These formulations and heating approach are effective at bonding gemstones to metallic articles of jewelry 10.

In other embodiments, the adhesion mixture has a ratio of about 50 wt % non-ferromagnetic metal particles to about 25 wt % ferromagnetic metal particles to about 25 wt % silica. This ratio was found particularly useful when heating the mixture by electromagnetic induction, which preferentially heats ferromagnetic particles faster than non-ferromagnetic metals. The heat generated by the ferromagnetic particles together with the non-ferromagnetic yet metallic particles melted the entire adhesion mixture more quickly than the kiln heating approach and tends to expose the underlying article of jewelry 10 to less stress. Thus, these formulations and heating approach are more preferred due to the accelerated time to achieve melting of the adhesion mixture. This electromagnetic induction approach with ferromagnetic particles is effective for bonding a gemstone layer 20 to a metallic articles of jewelry 10 as well as pearls.

In other embodiments, the adhesion mixtures for adhering gemstones to articles of jewelry 10 include a mixture of ferromagnetic particles, shell powder or finely crushed shell, and clay powder with polymer plastic. Preferably each is provided as nano-sized particles and generally in powdered form. In such mixtures, the ferromagnetic particles are typically provided in less abundance (in weight percentage) than a combination of the shell powder or finely crushed shell, and clay powder with polymer plastic. As an exemplary mixture includes a ratio of about 25 wt % ferromagnetic metal particles to about 25 wt % crushed shell to about 50 wt % clay with polymer plastic. This approach was found particularly useful when the article of jewelry 10 is a pearl, which also requires only brief heating by electromagnetic induction, thereby preserving the quality of the pearl.

Returning to a melting approach that relies on applying direct heat to melt the adhesion mixture, such as by heating an article of jewelry 10 with applied adhesion paste and gemstones in a kiln, the metal particles can be formed of any pure metal or metal alloy. The metal can be ferromagnetic or non-ferromagnetic. Among these include but are not limited to silver, gold, titanium, platinum, iron and stainless steel. Preferably, when using direct heating, the article of jewelry 10 is formed from a same metal or metal alloy as the metal used in the adhesion mixture, but this is not required. Furthermore, in such embodiments, the metal or metal alloy is preferably chosen such that it will melt prior to significant deformation of the article of jewelry 10 occurs. By "significant deformation" it is meant that the shape of the article of jewelry 10 is effected to an extent that can be observed by an ordinary purchaser under normal viewing parameters. That is, "significant deformation" refers to apparent changes to the article of jewelry 10 under ordinary viewing conditions. Avoiding "significant deformation" of the article of jewelry 10 is performed by ensuring the adhesion mixture melts more rapidly than the article of jewelry 10, thereby limiting exposure to the direct heat for only a short time.

Using the direct heating or kiln approach, best results were achieved when using metal particles embodied as a metal powder having nano-sized (e.g. 1-999 nm) particles; however, micron sized (e.g. 1-999 μm) particles may also be used. Millimeter sized (e.g. 1-5 mm) particles may also be used in some instances but are not preferred. Metal particles greater than about 5 mm should generally be avoided because heating may also result in deformation of the underlying article of jewelry 10 itself. The term "particle size" or "sized particles" generally refers to the diameter of a generally spherical particle, or the greatest length, width or height of a cubic particle, but could also apply to a greatest length, width or height of an irregular shaped particle. Metal powders can be purchased commercially through a variety of vendors. Alternatively, larger metal particles can be made smaller by techniques such as milling.

Now turning to approaches using electromagnetic induction, also referred to herein as "induction heating," to melt the adhesion mixture, which targets ferromagnetic metals to a greater extent than non-ferromagnetic metals, the metal particles used in the adhesion mixture include a ferromagnetic metal or a ferromagnetic alloy. Ferromagnetic metals are those that are strongly attracted by a magnetic force. Among these include iron, nickel, cobalt and gadolinium, which can be incorporated into the invention. Steel is a commonly used ferromagnetic alloy due to its high iron content and can therefore be used. In instances where electromagnetic induction is used to melt the adhesion mixture, the adhesion mixture should contain more than 10 wt % ferromagnetic particles. More generally, the adhesion mixture can contain from 10 wt % to 80 wt % ferromagnetic particles. More preferably, the adhesion mixture includes about 25 wt % ferromagnetic particles or 20 wt % to 30 wt % ferromagnetic particles. The remainder may be made up of non-ferromagnetic particles, silica, shell powder, clay with polymer plastic, and/or fillers as consistent with the underlying article of jewelry 10. For instance, it may be preferred to utilize a same metal that forms the article of jewelry 10, or it may be preferred to use a shell and/or clay in instances where the druzy or geode effect is to be applied to a pearl or other non-metal.

Best results were achieved when using ferromagnetic particles having nano-sized (e.g. 1-999 nm) particles; however, micron sized (e.g. 1-999 μm) particles may also be used. Millimeter sized (e.g. 1-5 mm) particles can also be used in some instances but are not preferred. Ferromagnetic particles greater than about 5 mm should generally be avoided because heating may also result in significant deformation of the underlying article itself. The term "particle size" or "sized particles" generally refers to the diameter of a generally spherical particle, or the greatest length, width or height of a cubic particle, but could also apply to a greatest length, width or height of an irregular shaped particle. Ferromagnetic particles can be purchased or can be formed, such as by milling.

Silica, also known as silicon dioxide, is commonly found in nature as quartz. Silica can also be obtained commercially in either powder form or gel form. Gel form is typically less preferred unless dried, because of its generally higher water content. The silica used in the methods herein is preferably nano-sized (e.g. 1-999 nm); however, micron sized (e.g. 1-999 μm) particles may also be used. Millimeter sized (e.g. 1-5 mm) particles may also be used in some instances but are much less preferred. In instances, where larger silica particles are available, they can be made smaller by techniques such as milling. For instance, quartz shavings left over from gemstone faceting can milled to form nano-sized silica particles. The term "particle size" or "sized particles" generally refers to the diameter of a generally spherical particle, or the greatest length, width or height of a cubic particle, but could also apply to a greatest length, width or height of an irregular shaped particle.

Shell and/or clay with polymer can also be mixed with ferromagnetic particles. Such embodiments may be preferred when bonding a gemstone layer 20 to a pearl or other non-metal; however, adhesion mixtures having non-ferromagnetic particles have also been used successfully with pearls. When using shell and/or clay with polymer, preferably the shell and clay with polymer is nano-sized (e.g. 1-999 nm), such as shell or clay powder; however, micron sized (e.g. 1-999 μm) particles may also be used. Millimeter sized (e.g. 1-5 mm) particles may also be used in some instances but are much less preferred. In instances, where larger shell or clay with polymer particles are available, they can be made smaller by techniques known in the jewelry arts. Both shell and clay with polymer are commercially available through many vendors. Calcium carbonate can also be used with or in place of shell.

In instances where gemstones are to be mounted to a flat substrate, the adhesion mixture can be applied without additional mixing with a liquid and thus be a substantially dry mixture. The term "substrate" as used herein refers to the surface upon which the mixture is added to ultimately adhere the gemstones to form a druzy or geode effect. When using silica, the ratio of metal particles to silica can vary but preferably silica forms at least 20% by weight of the mixture and more preferably about 25 wt % of the mixture, but certainly more than 10 wt % of the mixture. In some embodiments, the mixture ratio is about 75 wt % metal particles to about 25 wt % silica. In another embodiment, the mixture is about 50 wt % metal particles to about 50 wt % silica. The amounts referred to herein refer to total weight percentage. Thus, a mixture having 75 wt % metal particles can include 50 wt % of a first metal (e.g. non-ferromagnetic metal) plus 25 wt % of another metal (e.g. ferromagnetic metal). By "about" it is meant that that the amounts can vary by 10% more or less, with the total mixture, when dry, being 100 wt %.

Likewise, when using a dry mixture that combines ferromagnetic particles with shell and/or clay with polymer, the adhesion mixture can have a ratio of about 25 wt % ferromagnetic metal particles to about 25 wt % crushed shell to about 50 wt % clay with polymer plastic. In other embodiments the about 25 wt % ferromagnetic material is combined with about 75 wt % mixture of shell and clay with polymer. In other embodiments, less than 50 wt % ferromagnetic material is combined with more than 50 wt % mixture of shell and clay to a total of about 90-100 wt % with in some instances, additional impurities or fillers. Again, by "about" it is meant that that the amounts can vary by 10% more or less, with the total mixture, when dry, being 100 wt %.

In instances, where the substrate is curved, it is more preferred to add a liquid to the adhesion mixture to form a paste or thick slurry. In such instances, the adhesion paste was found to more evenly spread over the curved substrate. Procedurally, the adhesion mixture is formed with the desired ratio of weight percentages, then liquid is added slowly to the adhesion mixture while mixing or stirring to form a thick paste. A thick paste can be characterized as a media that can spread, but does not quickly flow or run when applied to a curved surface. In such embodiments, preferably the liquid is one that evaporates quickly when heat is applied so that it is used as essentially a spreading media without significantly affecting the final adhesion mixture after cooling.

Non-limiting examples of liquids that can be used to form an adhesion paste include water, alcohol, and acetone. Alcohols and acetones tend to be preferred because they tend to evaporate quickly. Preferred alcohols include those having fewer than 6 carbons. Examples of specific alcohols include methanol, ethanol, propanol, isopropanol, butanol, and tert-butanol. Alcohols greater than 80% purity are most preferred.

The adhesion mixture is added to the region of the article of jewelry 10 where the druzy or geode effect is desired so that the gemstones will adhere. The adhesion mixture can be applied by simple brushing. In some embodiments the article of jewelry 10 is carved to form a crevice where the adhesion mixture is applied.

Once the adhesion mixture is applied the gemstones are added to form the gemstone layer 20. The gemstones used in the methods can be high quality as indicated by a high grading, but are typically lesser grading. More frequently, the gemstones are crushed gemstones or fragments left over from previous faceting. Gemstones of different cut and shape tend to increase the druzy effect. Typically, the gemstones will be from 0.25 mm to about 1 mm in size, but of course the size can vary.

The druzy or geode effect is formed by way of the gemstone layer 20. Exemplary gemstones include one or more gems selected from the group consisting of an agate, an alexandrite, an amber, an arnetrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadeite, a kupzite, a lapis lazuli, a moonstone, a malachite, a moamite, an onyx, an opal, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, moissanite, and a zircon.

Best results have been achieved when ordering the placement of gemstones in the mixture. That is, preferably, gemstones are applied such that larger gems are added prior to smaller gems. For example, gems sized at about 1 mm would be added before gems sized at about 0.5 mm, which would be added before gems sized at about 0.25 mm. This approach forms an improved gemstone layer 20 by filling crevices left by adjacent irregularly cut gemstones. Most preferably, larger gems are added to the adhesion mixture first such that about one third to one half of the gem is pressed into the adhesion mixture. Less than the entire gem should be covered upon melting. To achieve this, pushing the gems downward with a bristle brush can help. Afterwards, smaller gems are added to fill the crevices between the larger gems to provide a gemstone layer 20, preferably such that the underlying substrate is not visible. Again a bristle brush can be used to gently press the gems into the crevices. To this end, it is most preferred to sort the gems according to size, add the largest gems first, then add smaller and still smaller gems. The artisan will appreciate that mixing different gems will produce different colored effects.

Once the gems are set, the adhesion mixture is melted to liquid form, then cooled to adhere the gemstone layer 20. Melting the liquid can be performed using different approaches depending on the material forming the adhesion mixture and the material forming the substrate to which the gemstones are adhered.

In approaches that include an article of jewelry 10 formed of a metal, such as silver, the step of melting the metal particles and silica can include applying direct heat by way of an oven, such as a kiln. A kiln is a thermally insulated chamber that produces temperatures sufficient to complete the melting process. To this end, the article of jewelry 10 is placed in a kiln and heated to a temperature that melts the metal particles and silica, thereby forming a molten metal-silica mixture with arranged gemstones. Afterwards, the article is allowed to slowly cool in the kiln, which bonds the gemstone layer 20 to the article of jewelry 10. Surprisingly, this approach was found effective even instances where the metal particles are formed of the same metal or metal alloy as the article of jewelry 10. Without being limited by way of mechanism, it is believe that the smaller metal particles melt faster than the article of jewelry 10 due to the higher ratio of surface area to volume in the particles.

Although the kiln approach is effective when using metallic or metal alloy substrates, the exposure period must be closely monitored due to the potential of substantially deforming the underlying article of jewelry 10. Still further, an additional challenge is presented with more fragile substrates. For example, articles of jewelry 10 formed from pearls are highly cherished, yet they would be susceptible to damage if baked in a kiln. To this end, a still further improvements were developed.

Electromagnetic induction or induction heating is a process where an alternating current is sent through an inductor (often a copper coil). The piece to be heated, in this instance the ferromagnetic particles of the adhesion mixture, are placed inside the inductor. The inductor serves as the transformer primary and the adhesion mixture becomes a short circuit secondary. When the adhesion mixture is placed within the inductor and enters the magnetic field, circulating eddy currents are induced within the adhesion mixture. These eddy currents flow against the electrical resistivity of the adhesion matrix, generating a precise and localized heat without any direct contact between the adhesion matrix and the inductor.

While heat will be induced in both ferromagnetic and non-ferromagnetic particles, additional heat is produced within the ferromagnetic particles. Magnetic materials naturally offer electrical resistance of the rapidly changing magnetic fields within the inductor. This resistance produces internal friction which in turn produces heat. Furthermore, small or thin parts generally heat more quickly than thick large parts. To this end, nano-sized ferromagnetic particles provide a highly effective mechanism for induction heating. Thus, by spiking the adhesion mixture with ferromagnetic particles, induction heating heats the adhesion mixture to a temperature that can melt the mixture more quickly, thereby reducing the risk of substantially deforming the article of jewelry 10. Experimentally it has be found about 20-50 wt % ferromagnetic particles within the mixture provides most favorable results, with concentrations above and below this range possible.

Once melted, the article of jewelry 10 is permitted to cool, which hardens the adhesion mixture to securely bond the gemstone layer 20 to the article of jewelry 10.

The invention has been developed to adhere a druzy-like or geode-like gemstone layer 20 to an article of jewelry 10; however, additional applications have also been realized. For example, a similar technical approach can be used to join non-ferromagnetic substrates. An exemplary method includes forming an adhesion mixture by mixing about 60-75 wt % non-ferromagnetic metal particles with about 25-40 wt % ferromagnetic metal particles, and optionally adding a liquid while mixing until reaching a consistency of a paste; positioning the adhesion mixture between two substrates thereby joining the two substrates; heating the mixture by electromagnetic induction to induce melting of the ferromagnetic metal particles for a time sufficient to melt the non-ferromagnetic particles; and cooling the ferromagnetic and non-ferromagnetic particles to bond the two substrates.

In some embodiments, the method is applied to bond different non-ferromagnetic metallic elements of an article of jewelry 10, which may be positioned within or extending outward from a druzy or geode-like layer 20. In other embodiments, the approach is used for industrial purposes such as in the electronics industry to join non-ferromagnetic metallic components. In still other embodiments, the approach is used for industrial purposes in the construction industry, to fuse non-ferromagnetic piping. In such embodiments the substrates for bonding can be metals or metal alloys. In some embodiments the mixture includes about 75 wt % non-ferromagnetic metal particles, which is preferably the same metal(s) as the article(s) to be bonded and about 25 wt % ferromagnetic metal particles.

Relatedly, in some embodiments, the method is applied to bond different non-ferromagnetic and non-metallic elements of an article of jewelry 10, which may be positioned within or extending outward from a druzy or geode-like layer 20. An exemplary method includes joining non-ferromagnetic substrates by forming an adhesion mixture by mixing about 25 wt % ferromagnetic metal particles with about 75% clay with polymer plastic, and optionally adding acetone while mixing until reaching a consistency of a paste; positioning the adhesion mixture between two non-ferromagnetic substrates thereby joining the two substrates; heating the mixture by electromagnetic induction to induce melting of the clay with polymer plastic; and cooling the adhesion mixture to bond the two substrates.

Example 1

Using a Molten Metal to Bond Gemstone Crystals to Metallic Jewelry

In an approach to adhere a gemstone layer, characterized by a plurality of different sized gemstones, onto a silver pendent to create a desired druzy or geode effect, it was believed that a molten metal could be used as an adhesive. This example details the formation and testing of such an article of jewelry, which was ultimately considered insufficient for the commercial sale of jewelry.

An article of silver jewelry was shaped and regions desiring an enhanced druzy or geode effect were identified.

Jewelry grade silver powder, characterized generally as having nano-sized particles was obtained. Alcohol was added to the silver powder and the mixture was stirred to form a paste. The paste was spread over the jewelry in areas for gemstone accent.

Crushed diamond crystals were roughly separated by size. Larger crystals were sprinkled onto the paste covered areas, followed by smaller and smaller groups of crystals. The article of jewelry was placed in a kiln and heated to melt the metal powder, thereby forming molten metal around the diamond crystals. The article was allowed to slowly cool in the kiln to solidify the molten silver to bond the diamond layer to the article of jewelry.

Testing of the diamond coating was performed by visual inspection under 10× microscopy and by physical rubbing of the diamond layer between the fingers. Visual inspection revealed gaps between the diamond and metal and some, but not extensive, oxidation. Rubbing was able to dislodge diamond crystals. Therefore, this method would not create a high quality effect.

Example 2

Using a Molten Metal-Silica Mixture to Improve Bonding of Gemstone Crystals to Metallic Jewelry After extensive testing, the following process was developed for instances where the article of jewelry is a metal or metal alloy having a same or higher melting temperature than the metal used to form the adhesion mixture, which is believed to be due to the faster melting of smaller-sized particles. The following procedure resulted in no identifiable oxidation. In addition, improved bonding of diamond crystals to the metallic article of jewelry was observed.

An article of silver jewelry was shaped and regions desiring an enhanced druzy or geode effect were identified.

Jewelry grade silver powder, characterized generally as nano-sized particles was obtained. Nano-sized silica powder was also obtained. The silver metal powder was mixed with silica in a relationship of 75 wt % metal to 25 wt % silica. Alcohol was added slowly while mixing to form a paste. The paste was spread over the jewelry in areas for gemstone accent.

Diamond crystals were roughly separated by size. Larger crystals are sprinkled to the paste areas, followed by smaller and smaller groups of crystals to form a gemstone layer to hide the underlying substrate.

The article of jewelry was placed in a kiln and heated to a temperature melting the metal-silica mixture, thereby forming a molten mixture with arranged diamond crystals. The article was allowed to slowly cool in the kiln in hopes of bonding the diamond layer to the article of jewelry.

Testing of the diamond layer was performed by visual inspection under 10× microscopy and by physical rubbing of the diamond layer between the fingers. No gaps were visually identified between the gemstones and metal-silica mixture. Physical rubbing dislodged far fewer diamond crystals than the approach of Example 1. Therefore, this method is considered effective for creating a druzy or geode effect on jewelry.

Example 3

Using a Molten Metal-Silica Mixture of Precious and Ferromagnetic Metals to Improve Bonding of Gemstone Crystals to Pearls After extensive testing, the following process was developed for instances where the article of jewelry is a pearl or metal alloy having a low melting temperature. The fragility of the pearl and metal with low melting temperature risk deformation if exposed to high heat under a kiln. The following procedure resulted in no identifiable oxidation. In addition, high quality bonding of diamond crystals to the pearl was observed.

A pearl was chosen to display a druzy or geode effect for use in jewelry. The nacre coating was sculpted to provide crevices where an enhanced druzy or geode effect was desired.

Jewelry grade silver powder, characterized generally as nano-sized particles was obtained. Nano-sized iron powder was obtained. Nano-sized silica powder was also obtained. The silver metal powder was mixed with the iron powder and silica in a relationship of 50 wt % silver (non-ferromagnetic metal) to 25 wt % iron (ferromagnetic metal) to 25 wt % silica. Alcohol was added slowly while mixing to form a paste. The paste was spread over the pearl in areas for gemstone accent.

Diamond crystals were roughly separated by size. Larger crystals were sprinkled over the crevices, followed by smaller and smaller groups of crystals.

The pearl was placed in an induction heater for about 30 seconds to induce electromagnetic induction. The electromagnetic induction heater selectively heats the ferromagnetic material, which is believed to transfer the heat to the neighboring non-ferromagnetic metal and silica to form a melt of the non-ferromagnetic material and silica. The paste was allowed to slowly cool, in hopes of bonding the diamond layer to the pearl.

Testing of the diamond layer was performed by visual inspection under 10× microscopy and by physical rubbing of the diamond layer between the fingers. No pores or gaps were visually identified in the metal-silica mixture. Physical rubbing dislodged far fewer diamond crystals that the approach of Example 1. Therefore, this method is considered effective for creating a druzy or geode effect on jewelry.

Example 4

Using a Molten Metal-Silica Mixture of Precious and Ferromagnetic Metals to Improve Bonding of Gemstone Crystals to Pearls After extensive testing, the following process was developed for instances where the article of jewelry is a pearl or metal alloy having a low melting temperature. The following procedure resulted in no identifiable oxidation. In addition, high quality bonding of diamond crystals to the pearl was observed.

A pearl was harvested and treated for use in jewelry. The nacre coating was sculpted to provide crevices where an enhanced druzy or geode effect was desired.

Nano-sized iron powder was obtained. Shell was milled to crush the shell into a powder. Nano-sized clay powder with plastic polymer was also obtained. Iron powder, shell powder and clay powder with plastic polymer were mixed in a relationship of 25 wt % iron (ferromagnetic metal) to 25 wt % crushed shell to 50 wt % clay powder and plastic polymer. Acetone was added slowly during mixing to form a paste. The paste was spread over the crevices of the pearl in areas for accent.

Diamond crystals were roughly separated by size. Larger crystals were sprinkled over the crevices, followed by smaller and smaller groups of crystals.

The pearl was placed in an induction heater for about 20 seconds to induce electromagnetic induction. The electromagnetic induction selectively heats the ferromagnetic material, which is believed to transfer the heat to the neighboring shell and clay/polymer to form a melt of the shell and clay/polymer. The pearl was allowed to slowly cool, in hopes of bonding the diamonds to the pearl.

Testing of the diamond layer was performed by visual inspection under 10× microscopy and by physical rubbing of the diamond coating between the fingers. No pores were visually identified in the iron/shell/clay/polymer mixture. Physical rubbing dislodged significantly fewer diamond crystals than the approach of Example 1. Therefore, this method is considered effective for creating a druzy or geode effect on jewelry.

What is claimed is:

1. A method of manufacturing an article of jewelry with a druzy or geode effect, the method comprising:
    a) forming an adhesion mixture by mixing metal particles with a silica to form an adhesion paste;
    b) applying the adhesion mixture to the article of jewelry;
    c) applying a plurality of gemstones to the applied adhesion mixture to form a gemstone layer;
    d) melting the metal particles and silica without substantially melting the article of jewelry; and e) cooling the melted particles and silica to bond the gemstone layer to the article of jewelry.

2. The method of claim 1, wherein the adhesion mixture comprises a ratio of about 75 wt % metal particles to about 25 wt % silica.

3. The method of claim 2, wherein the step of melting the metal particles and silica comprises heating the article of jewelry with the gemstone layer.

4. The method of claim 1, wherein the adhesion mixture comprises a ratio of about 50 wt % non-ferromagnetic metal particles to about 25 wt % ferromagnetic metal particles to about 25 wt % silica.

5. The method of claim 4, wherein the step of melting the metal particles and silica comprises heating the ferromagnetic particles by electromagnetic induction to induce melting of the adhesion mixture.

6. The method of claim 1, wherein the metal particles comprise a metal alloy.

7. The method of claim 1, wherein the metal particles comprise a metal or metal alloy selected from one or more of the group consisting of silver, gold, titanium, platinum, iron, and stainless steel.

8. The method of claim 1, wherein the silica comprises silicon dioxide.

9. The method of claim 1, wherein the silica comprises silica powder.

10. The method of claim 1, wherein the metal particles and silica are mixed with an alcohol or an acetone.

11. The method of claim 10, wherein the metal particles and silica are mixed with the alcohol and the alcohol comprises fewer than 6 carbons.

12. The method of claim 11, wherein the alcohol is selected from the group consisting of methanol, ethanol, propanol, isopropanol, butanol, and tert-butanol.

13. The method of claim 1, wherein the adhesion mixture is applied to carved grooves within the article of jewelry.

14. The method of claim 1, wherein the article of jewelry is a pearl or is formed from a metal or metal alloy comprising at least one member selected from the group consisting of silver, gold, titanium, platinum, and stainless steel.

15. The method of claim 1, wherein the article of jewelry is formed of a same metal as the metal particles.

16. The method of claim 1, wherein the plurality of gemstones comprises two or more different gems, wherein at least one gem is selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

17. The method of claim 1, wherein the step of applying the plurality of gemstones comprises applying larger gems prior to applying smaller gems.

18. A method of manufacturing an article of jewelry with a druzy or geode effect, the method comprising:
a) forming an adhesion mixture by mixing ferromagnetic metal particles, crushed shell, and clay with polymer plastic, to form an adhesion paste;
b) applying the adhesion mixture to an article of jewelry;
c) applying a plurality of gemstones to the applied adhesion mixture to form a gemstone layer;
d) heating the ferromagnetic metal particles by way of electromagnetic induction to melt the adhesion mixture; and
e) cooling the melted particles, crushed shell, and clay with polymer plastic to bond the gemstone layer to the article of jewelry.

19. The method of claim 18, wherein the adhesion mixture comprises a ratio of about 25 wt % ferromagnetic metal particles to about 25 wt % crushed shell to about 50 wt % clay with polymer plastic.

* * * * *